(12) United States Patent
Shen

(10) Patent No.: US 12,534,373 B2
(45) Date of Patent: Jan. 27, 2026

(54) CURED PRODUCT CONTAINING SINGLE-LAYER GRAPHENE, SINGLE-LAYER GRAPHENE, PREPARATION METHOD THEREFOR, AND ARTICLE CONTAINING SINGLE-LAYER GRAPHENE

(71) Applicant: TONGXIANG SMALL BOSS SPECIAL PLASTIC PRODUCTS CO., LTD., Tongxiang (CN)

(72) Inventor: Jianqing Shen, Tongxiang (CN)

(73) Assignee: TONGXIANG SMALL BOSS SPECIAL PLASTIC PRODUCTS CO., LTD., Tongxiang Zhenjiang (CN)

( * ) Notice: Subject to any disclaimer, the term of this patent is extended or adjusted under 35 U.S.C. 154(b) by 925 days.

(21) Appl. No.: 17/756,122

(22) PCT Filed: Dec. 27, 2019

(86) PCT No.: PCT/CN2019/129116
§ 371 (c)(1),
(2) Date: May 18, 2022

(87) PCT Pub. No.: WO2021/128257
PCT Pub. Date: Jul. 1, 2021

(65) Prior Publication Data
US 2023/0105285 A1    Apr. 6, 2023

(51) Int. Cl.
*C01B 32/225* (2017.01)
*C01B 32/19* (2017.01)

(52) U.S. Cl.
CPC .......... *C01B 32/225* (2017.08); *C01B 32/19* (2017.08); *C01B 2204/02* (2013.01); *C01B 2204/04* (2013.01)

(58) Field of Classification Search
CPC ... C01B 32/225; C01B 32/19; C01B 2204/02; C01B 2204/04
See application file for complete search history.

(56) References Cited

U.S. PATENT DOCUMENTS

| 9,845,244 B2 * | 12/2017 | Kozyuk | ..................... B01J 3/08 |
| 2017/0081191 A1 | 3/2017 | Kozyuk | |
| 2018/0016149 A1 | 1/2018 | Zhamu et al. | |

FOREIGN PATENT DOCUMENTS

| CN | 105324241 A | 2/2016 |
| CN | 105776190 A | 7/2016 |

(Continued)

OTHER PUBLICATIONS

"Centrifugal Separation" Sciencedirect <https://www.sciencedirect.com/topics/engineering/centrifugal-separation> Accessed Nov. 26, 2024. (2024).*

(Continued)

*Primary Examiner* — Richard M Rump
(74) *Attorney, Agent, or Firm* — Heslin Rothenberg Farley & Mesiti P.C.

(57) ABSTRACT

Provided are a cured product containing a single-layer graphene, a single-layer graphene, a preparation method therefor, and an article containing a single-layer graphene. The method for preparing the cured product containing a single-layer graphene includes (a) mixing graphite with a curable material and optionally a first solvent, and curing and molding same to obtain molded granules; (b) heating a system formed by the molded granules and optionally a second solvent, then introducing a gas for pressurization, and then releasing the pressure to obtain expanded granules; and (c) repeating step (a) and (b) several times, with the graphite and the curable material in step (a) replaced with the expanded granules, to obtain a cured product containing a single-layer graphene. The cured product containing a single-layer graphene is carbonized and separated to obtain a single-layer graphene. The article containing a single-layer graphene contains the cured product or the single-layer graphene.

19 Claims, 1 Drawing Sheet

(56) References Cited

FOREIGN PATENT DOCUMENTS

| | | | | |
|---|---|---|---|---|
| CN | 107032334 A | 8/2017 | | |
| CN | 107298440 A | 10/2017 | | |
| CN | 107400246 A | 11/2017 | | |
| CN | 107601478 A | * | 1/2018 | |
| CN | 109733017 A | 5/2019 | | |
| CN | 110272038 A | * | 9/2019 | ............ C01B 32/19 |
| JP | 2015537075 A | 12/2015 | | |
| JP | 2016519191 A | 6/2016 | | |
| JP | 2019508510 A | 3/2019 | | |
| KR | 20170137392 A | 12/2017 | | |
| KR | 20180094874 A | 8/2018 | | |
| WO | 2017048524 A1 | 3/2017 | | |

OTHER PUBLICATIONS

Written Opinion and International Search Report in Application No. PCT/CN2019/129116, 13 pages, with partial translation Sep. 28, 2020.
First Office Action in Chinese Application No. 201980003395.1, 10 pages with translation Jul. 6, 2021.
Second Office Action in Chinese Application No. 201980003395.1, 8 pages with translation Jan. 5, 2022.
Notification to Grant Patent Right for Invention in Chinese Application No. 201980003395.1, 3 pages with translation Mar. 2, 2022.
Search Report in Chinese Application No. 201980003395.1, 1 page Jun. 29, 2021.
European Search Report in EP Application No. 19957326.2, 3 pages. Jan. 17, 2023.
Notice of Submission of Opinion in KR Application No. 10-2022-7026136, 8 pages with translation. Dec. 13, 2023.
Notice of Submission of Opinion in KR Application No. 10-2022-7026136, 6 pages with translation. Aug. 19, 2024.
Notice of Decision to Grant Patent in KR Application No. 10-2022-7026136, 7 pages with translation. Apr. 24, 2025.
Communication pursuant to Article 94(3) EPC in EP Application No. 19957326.2, 5 pages. Jan. 27, 2023.
Communication pursuant to Article 94(3) EPC in EP Application No. 19957326.2, 3 pages. Jun. 9, 2023.
Communication pursuant to Article 94(3) EPC in EP Application No. 19957326.2, 4 pages. Jan. 12, 2024.
Notice of Reasons to Refusal in JP Application No. 2022-533382, 8 pages with translation. Jun. 27, 2023.
Notice of Reasons to Refusal in JP Application No. 2022-533382, 4 pages with translation. Jan. 9, 2024.
Decision to Grant a Patent in JP Application No. 2022-533382, 6 pagse with translation. Jul. 30, 2024.

* cited by examiner

CURED PRODUCT CONTAINING SINGLE-LAYER GRAPHENE, SINGLE-LAYER GRAPHENE, PREPARATION METHOD THEREFOR, AND ARTICLE CONTAINING SINGLE-LAYER GRAPHENE

CROSS REFERENCE TO RELATED APPLICATION

This application is a U.S. National Phase filing under 35 U.S.C. § 371 of International Application PCT/CN2019/129116, filed on Dec. 27, 2019, and published as WO 2021/128257 A1 on Jul. 1, 2021. The entire contents of this prior application is hereby incorporated herein by reference.

TECHNICAL FIELD

The present disclosure relates to the technical field of graphene, in particular to a cured product containing a single-layer graphene, a single-layer graphene and a preparation method therefor, and an article containing a single-layer graphene.

BACKGROUND ART

Graphene, a two-dimensional carbon nanomaterial with hexagonal honeycomb lattices composed of carbon atoms with sp hybrid orbits, has excellent optical, electrical, and mechanical properties, has important application prospects in aspects such as materials science, micro-nano processing, energy sources, biomedicine, and drug delivery, and is considered as a revolutionary material in the future.

There are many preparation methods for graphene. However, the graphene prepared by the existing methods are mostly multi-layer graphene (which also can be called as graphene microplates). It is hard to prepare a single-layer graphene, a large amount of pollutants are generated in the preparation process, and the preparation scale is small, thus it is difficult to realize industrial scale production.

In view of this, the present disclosure is specifically proposed to solve at least one of the above technical problems.

SUMMARY

A first objective of the present disclosure lies in providing a preparation method for a cured product containing a single-layer graphene, wherein the preparation method can prepare the cured product containing a single-layer graphene, and the preparation process will not produce pollution, and is suitable for industrial scale production.

A second objective of the present disclosure lies in providing a cured product containing a single-layer graphene, prepared by the above preparation method for a cured product containing a single-layer graphene.

A third objective of the present disclosure lies in providing a preparation method for a single-layer graphene, in which the single-layer graphene is prepared with the above cured product containing a single-layer graphene.

A fourth objective of the present disclosure lies in providing a single-layer graphene, prepared by the above preparation method for a single-layer graphene.

A fifth objective of the present disclosure lies in providing an article containing a single-layer graphene, prepared with the above cured product containing a single-layer graphene or the above single-layer graphene.

A preparation method for a cured product containing a single-layer graphene provided in the present disclosure includes the following steps:
 (a) mixing graphite with a curable material and optionally a first solvent, and curing and molding the same to obtain molded granules;
 (b) heating a system formed by the molded granules and optionally a second solvent, then introducing a gas to the system for pressurization, a pressure of pressurization being 0.2-60.0 Mpa, and then releasing the pressure to obtain expanded granules; and
 (c) repeating steps (a) and (b) several times, with the graphite and the curable material in step (a) replaced with the expanded granules, to obtain the cured product containing a single-layer graphene.

Further, on the basis of the above technical solution, in step (a), the curable material includes any one of thermoplastic polymer, flour and rice flour;
 preferably, in step (a), the thermoplastic polymer includes any one or a combination of at least two of resin, plastic, thermoplastic rubber, thermoplastic elastomer, and hot melt adhesive;
 preferably, in step (a), the resin includes any one or a combination of at least two of polyethylene, acrylonitrile-butadiene-styrene copolymer, polycarbonate, polyvinyl chloride, and polypropylene;
 preferably, in step (a), the plastic includes any one or a combination of at least two of rigid thermoplastic plastic, soft plastic, and semi-rigid plastic;
 preferably, in step (a), the thermoplastic rubber includes any one or a combination of at least two of TPU, NBR, SBS, TPE, and EPDM;
 preferably, in step (a), the thermoplastic elastomer includes any one or a combination of at least two of TPEE, PUR, TPV, and TEEE;
 preferably, in step (a), a particle size of the graphite is 20-12,500 meshes;
 preferably, in step (a), a mass ratio of the graphite to the curable material is (0.5-200):100; and
 preferably, in step (a), a particle diameter of the molded granules is 0.2-10 mm.

Further, on the basis of the above technical solution, in step (b), a temperature of heating is 50-880° C., and time of heating is 5-60 min; and preferably, in step (b), the gas includes any one or a combination of at least two of air, oxygen gas, hydrogen gas, carbon dioxide, and nitrogen gas;
 preferably, in step (b), a pressure of pressurization is 0.3-50.0 MPa, and time of pressurization is 5-70 min; and
 preferably, in step (b), the pressure is released to a normal pressure, and time for releasing the pressure to the normal pressure is less than 1 min.

Further, on the basis of the above technical solution, in step (a), the first solvent includes water; and
 preferably, in step (b), the second solvent includes water and/or a lubricant.

Further, on the basis of the above technical solution, the preparation method for a cured product containing a single-layer graphene includes the following steps:
 (d) mixing graphite and a curable material, and extruding the same to obtain molded granules, wherein the curable material includes a thermoplastic polymer;
 (e) placing a system formed by the molded granules and water in an air-tight reaction device for heating, a temperature of heating being 50-880° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and (f) repeating steps (a) and (b) several times, with the graphite and the curable material in step (a) replaced with the expanded granules, to obtain the cured product containing a single-layer graphene; and alternatively, the preparation method for a cured product containing a single-layer graphene includes the following steps:

(g) mixing graphite with a curable material and water, curing and molding the same, and drying to obtain molded granules, wherein the curable material includes flour or rice flour;

(h) placing the molded granules in an air-tight reaction device for heating, a temperature of heating being 60-200° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and (i) repeating steps (a) and (b) several times, with the graphite and the curable material in step (a) replaced with the expanded granules, to obtain the cured product containing a single-layer graphene.

The present disclosure further provides a cured product containing a single-layer graphene, prepared by the above preparation method for a cured product containing a single-layer graphene;

preferably, a mass fraction of the single-layer graphene in the cured product containing a single-layer graphene is 20-99%.

The present disclosure further provides a preparation method for a single-layer graphene, including the following steps:

performing carbonization treatment on the above cured product containing a single-layer graphene, and separating a product obtained through the carbonization treatment to obtain the single-layer graphene.

Further, on the basis of the above technical solution, the cured product containing a single-layer graphene is subjected to carbonization treatment, and then the product obtained through the carbonization treatment is separated according to specific weight to obtain the single-layer graphene;

preferably, a temperature of the carbonization treatment is 200-500° C., and time of the carbonization treatment is 0.08-3 h; and preferably, a separation medium used in the separation according to the specific weight is water.

The present disclosure further provides a single-layer graphene, prepared by the above preparation method for a single-layer graphene.

The present disclosure further provides an article containing a single-layer graphene, prepared with the above cured product containing a single-layer graphene or the single-layer graphene.

The cured product containing a single-layer graphene, the single-layer graphene and the preparation method for the same, and the article containing a single-layer graphene provided in the present disclosure have the following beneficial effects.

(1) In the present disclosure provides a preparation method for a cured product containing a single-layer graphene, graphite is first mixed with a curable material and optionally a first solvent, and cured and molded, a system formed by molded granules obtained through the curing and molding and optionally a second solvent is heated, a gas is then introduced for pressurization, wherein the gas generates a certain acting force on the molded granules at a specific pressure, and the gas penetrates into the molded granules, thus when the pressure is suddenly released, an instantaneous pressure difference and strong impact will be generated to cause the molded granules to generate a lot of micropores and expand. The graphite in the molded granules can be forcedly exfoliated in the process of forming the micropores. By making the obtained expanded granules repeatedly subjected to the above steps several times, the conversion of the graphite in the molded granules into a single-layer graphene can be realized, so as to obtain the cured product containing a single-layer graphene.

This preparation method implements the conversion of the graphite in the molded granules into the graphene by using the physical effect of the gas on the molded granules, without any chemical reaction with the graphite, thus ensuring the high purity of the cured product containing a single-layer graphene, moreover, no pollutants will be generated in the whole preparation process, which is suitable for large-scale industrial preparation.

(2) The present disclosure provides a cured product containing a single-layer graphene, prepared by the above preparation method for a cured product containing a single-layer graphene, and the cured product containing a single-layer graphene can be directly used for industrial production.

(3) The present disclosure provides a preparation method for a single-layer graphene, wherein the single-layer graphene is obtained by performing carbonization treatment on the cured product containing a single-layer graphene, and then separating a product obtained through the carbonization treatment. This preparation method is stable in technology, simple in operation, and suitable for industrial scale production, and the single-layer graphene prepared by the preparation method has high purity and excellent performance.

(4) The present disclosure provides a single-layer graphene, prepared by the above preparation method for a single-layer graphene, wherein the single-layer graphene has high purity and excellent performance, and can be directly used for industrial production.

(5) The present disclosure provides an article containing a single-layer graphene. Given the advantages of the above cured product containing a single-layer graphene or the single-layer graphene, the article containing a single-layer graphene, with the cured product containing a single-layer graphene or the single-layer graphene as a raw material, is imparted with the same advantages.

BRIEF DESCRIPTION OF DRAWINGS

In order to more clearly illustrate the technical solutions in specific embodiments of the present disclosure or in the prior art, accompanying drawings which need to be used in the description of the specific embodiments or the prior art will be introduced briefly below, and apparently, the accompanying drawings in the description below merely show some embodiments of the present disclosure, and a person ordinarily skilled in the art still could obtain other drawings in light of these drawings without creative efforts.

DETAILED DESCRIPTION OF EMBODIMENTS

Figure 1:
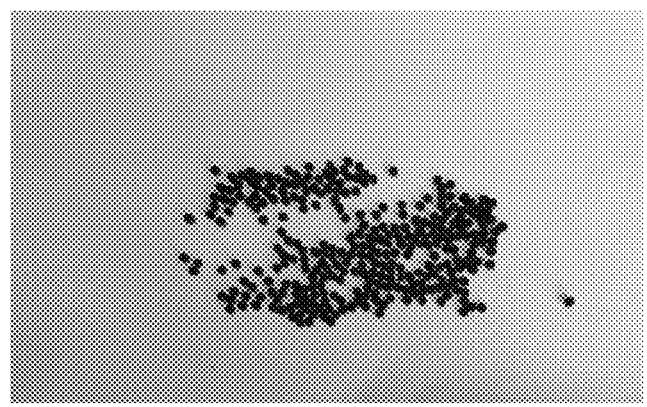
FIG. 1 is a morphological view of molded granules provided in Example 1 of the present disclosure.

Technical solutions of the present disclosure will be described below clearly and completely in combination with examples, and apparently, the examples described are only some, but not all examples of the present disclosure. Based on the examples in the present disclosure, all of other examples, obtained by a person ordinarily skilled in the art without using creative efforts, shall fall within the scope of protection of the present disclosure.

According to a first aspect of the present disclosure, there is provided a preparation method for a cured product containing a single-layer graphene, including the following steps:

(j) mixing graphite with a curable material and optionally a first solvent, and curing and molding the same to obtain molded granules;

(k) heating a system formed by the molded granules and optionally a second solvent, then introducing a gas to the system for pressurization, a pressure of pressurization being 0.2-60.0 Mpa, and then releasing the pressure to obtain expanded granules; and (l) repeating steps (a) and (b) several times, with the graphite and the curable material in step (a) replaced with the expanded granules, to obtain the cured product containing a single-layer graphene.

In step (a), the curable material refers to a material capable of adhering/bonding graphite and allowing the graphite to be exfoliated/stripped by the adhesion action between the curable material and the graphite in the subsequent treatment process (step (b)). The curable material can be mixed with graphite and cured and molded. The curing and molding function to prepare the mixed graphite and curable material into molded granules, so that interfaces between the graphite and the curable material have a tight adhesive force, thus facilitating exfoliating the graphite in the subsequent treatment process (step (b)).

In the present disclosure, the curable material is not particularly limited, and typical but non-limiting curable materials may be thermoplastic polymer, flour, rice flour, or the like.

Typical but non-limiting ways of curing and molding include: extrusion molding, squeezing molding, tableting molding, flow compression molding, or the like.

It should be noted that the "optionally a first solvent" in step (a) in the present disclosure means that the first solvent may be or may not be added. Whether adding the first solvent or not is determined by the properties of the curable material. Generally, if a viscous mixture can be formed when the curable material and the graphite are cured and molded, the first solvent does not need to be added; and if the viscous mixture cannot be formed when the curable material and the graphite are cured and molded, the first solvent needs to be added.

In step (b), the molded granules obtained by curing and molding and optionally the second solvent are mixed to form the system, the system is heated, wherein the heating can make the molded granules in a semi-molten state, then the gas is introduced into the system for pressurization, wherein the pressurization treatment makes the gas generate a certain acting force on the molded granules in the system, and penetrate into the softened molded granules. When the pressure is suddenly released, an instantaneous pressure difference and strong impact generated cause the molded granules to expand and generate a lot of micropores. As there is a certain adhesive force at the interfaces between the curable material and the graphite in the molded granules, the curable material in the molded granules will forcedly exfoliate the graphite in the molded granules in the process of forming the micropores, thereby obtaining the expanded granules.

It should be noted that the "optionally the second solvent" in the present disclosure means that the second solvent may be or may not be added. Whether adding the second solvent or not needs to be determined by the properties of the molded granules. For the present disclosure, when the curable material is a puffed food such as flour or rice flour, the second solvent does not need to be added, and in other cases the second solvent needs to be added. The kind of the second solvent in step (b) is not specifically limited as long as it can make the molded granules isolated from each other to a certain extent so as not to be adhered to each other.

The purpose of introducing the gas into the system formed by the molded granules and optionally the second solvent is to make the system maintain a certain pressure. The kind of gas added is not specifically limited, and may be typically, but not limited to, a conventional gas such as air, oxygen gas, hydrogen gas, nitrogen gas, carbon dioxide or the like.

The temperature and time of heating and the pressure and time of pressurization need to be determined according to the properties (e.g., softening temperature) of the molded granules. A typical but non-limiting pressure of pressurization is 0.2 Mpa, 0.5 MPa, 1.0 MPa, 1.5 MPa, 2.0 MPa, 5.0 MPa, 10.0 MPa, 15.0 MPa, 20.0 MPa, 25.0 MPa, 30.0 MPa, 35.0 MPa, 40.0 MPa, 45.0 MPa, 50.0 MPa, 55.0 MPa or 60.0 MPa. The pressure of pressurization cannot be too low, and when the pressure of pressurization is lower than 0.2 MPa, it is hard to realize the conversion from graphite to graphene. When the pressure of pressurization is over-high, higher than 60.0 MPa, the conversion effect of graphite to graphene cannot be further improved, and on the contrary, more energy sources are consumed, so that the production cost is increased.

Since it is difficult to convert the graphite in the expanded granules into the single-layer graphene by performing step (b) only once, step (c) needs to be performed, that is, steps (a) and (b) are repeated several times (for example, 10-60 times), with the graphite and the curable material in step (a) replaced with the expanded granules, to obtain the cured product containing a single-layer graphene.

It should be noted that, after the expanded granules are obtained for the first time, the graphite and the curable material in step (a) need to be replaced with the expanded granules each time steps (a) and (b) are repeated later. The number of times of repeating steps (a) and (b) needs to be set according to the particle size of graphite in the expanded granules obtained in step (b) and the desired content of the single-layer graphene. When the content of single-layer graphene in the expanded granules is fixed, the larger the particle size of the graphite is, the more the times of repeating steps (a) and (b) are needed, and on the contrary, the smaller the particle size of the graphite is, the fewer the times of repeating steps (a) and (b) are needed.

The content of the graphene or graphite in the expanded granules is detected, and when the mass fraction of the graphite in the expanded granules converted into the single-layer graphene reaches 10-90% (for example, when the mass fraction is 10%, that is, 10% of the graphite is converted into the single-layer graphene; for example, when the mass fraction is 90%, that is, 90% of the graphite is converted into the single-layer graphene), the repetition of steps (a) and (b) can be terminated, so as to obtain the cured product containing a single-layer graphene.

The resistance value of the expanded granules may also be measured using a surface/volume resistivity tester, and the repetition of steps (a) and (b) can be terminated when the resistance value of the expanded granules does not substantially change before and after the repeating (cycling), to obtain the cured product containing a single-layer graphene. Generally, the lower the resistance of the cured product containing a single-layer graphene is, the higher the mass fraction of graphite converted into single-layer graphene is, whereas the higher the resistance of the cured product containing a single-layer graphene is, the lower the mass fraction of graphite converted into single-layer graphene is.

The preparation method implements the conversion of the graphite in the molded granules into multi-layer graphene and further into single-layer graphene by using the physical effect of the gas on the molded granules, without any chemical reaction with the graphite, thus ensuring the purity of the cured product containing a single-layer graphene, moreover, no pollutants will be generated in the whole preparation process, which is suitable for large-scale industrial preparation.

As an optional embodiment of the present disclosure, in step (a), the curable material includes any one of thermoplastic polymer, flour and rice flour;

Preferably, in step (a), the thermoplastic polymer includes any one or a combination of at least two of resin, plastic, thermoplastic rubber, thermoplastic elastomer, and hot melt adhesive;

Preferably, in step (a), the resin includes any one or a combination of at least two of polyethylene, acrylonitrile-butadiene-styrene copolymer, polycarbonate, polyvinyl chloride, and polypropylene;

Preferably, in step (a), the plastic includes any one or a combination of at least two of rigid thermoplastic plastic, soft plastic, and semi-rigid plastic;

Preferably, in step (a), the thermoplastic rubber includes any one or a combination of at least two of thermoplastic polyurethanes (TPU), nitrile butadiene rubber (NBR), styrene-butadiene block copolymer (SBS), TPE, and ethylene propylene diene monomer (EPDM);

Preferably, in step (a), the thermoplastic elastomer includes any one or a combination of at least two of thermoplastic polyester elastomer (TPEE), polyurethane (PUR), thermoplastic vulcanizate (TPV), and thermoplastic elastomer ether-ester (TEEE).

By defining the specific types of the curable material, the curable material can achieve a good curing effect with graphite. Moreover, the selection of the type of the curable material can be determined according to actual production requirements. For example, when the polyethylene material containing a single-layer graphene needs to be processed in actual production, polyethylene is selected as the curable material.

The graphite used in step (a) may be squamous or powdery, and the particle size of the graphite may be determined according to the use. As an optional embodiment of the present disclosure, in step (a), the particle size of the graphite is 20-12,500 meshes; and a typical but non-limiting particle size of the graphite is 20 meshes, 30 meshes, 40 meshes, 50 meshes, 60 meshes, 80 meshes, 90 meshes, 100 meshes, 200 meshes, 400 meshes, 500 meshes, 800 meshes, 1,000 meshes, 2,000 meshes, 3,000 meshes, 4,000 meshes, 5,000 meshes, 6,000 meshes, 7,000 meshes, 8,000 meshes, 9,000 meshes, 10,000 meshes, 11,000 meshes, 12,000 meshed or 12,500 meshes.

By further defining the particle size of the graphite, the graphite and the curable material can be well mixed.

As an optional embodiment of the present disclosure, in step (a), the mass ratio of the graphite to the curable material is (0.5-200):100; and a typical but non-limiting mass ratio of the graphite to the curable material is 0.5:100, 1:100, 5:100, 10:100, 20:100, 30:100, 40:100, 50:100, 60:100, 70:100, 80:100, 90:100, 100:100, 120:100, 150:100 or 200:100.

By specifically defining the mass ratio of the graphite to the curable material, the content of single-layer graphene in the final product, cured product containing the single-layer graphene is suitable, which facilitates subsequent direct production and utilization.

As an optional embodiment of the present disclosure, in step (a), the first solvent includes water.

As an optional embodiment of the present disclosure, in step (a), the particle diameter of the molded granules is 0.2-10 mm.

A typical but non-limiting particle diameter of the molded granules is 0.2 mm, 1 mm, 2 mm, 4 mm, 5 mm, 6 mm, 8 mm or 10 mm.

As an optional embodiment of the present disclosure, in step (b), the temperature of heating is 50-880° C., and the time of heating is 5-60 min.

A typical but non-limiting temperature of heating is 50° C., 60° C., 100° C., 150° C., 200° C., 250° C., 300° C., 350° C., 400° C., 450° C., 500° C., 550° C., 600° C., 650° C., 700° C., 750° C., 800° C., 850° C. or 880° C. Typical but non-limiting time of heating is 5 min, 6 min, 10 min, 15 min, 20 min, 25 min, 30 min, 35 min, 40 min, 45 min, 50 min, 55 min, or 60 min.

The time of heating may be set according to the softening temperature of different molded granules (or curable materials). For example, typically, but not by way of limitation, when the curable material is polyethylene, the time of heating of the molded granules is 10-50 min; when the curable material is thermoplastic elastomer, the time of heating of the molded granules is 5-30 min; and when the curable material is rice flour, the time of heating of the molded granules is 5-20 min.

As an optional embodiment of the present disclosure, in step (b), the gas includes any one or a combination of at least two of air, oxygen gas, hydrogen gas, carbon dioxide, and nitrogen gas.

It should be noted that, when different kinds of gases are selected to mix, it is necessary to ensure that the content of each gas in the mixed gas is within a safe amount range, so as to ensure that a potential safety risk does not occur.

By specifically defining the kind of the gas, the gas will not produce any reaction with the graphite, ensuring the purity of the cured product containing a single-layer graphene.

In step (b), the gas is introduced into the system for pressurization, and the pressure and time of pressurization can be determined according to the softening temperatures of different molded granules.

As an optional embodiment of the present disclosure, in step (b), the pressure of pressurization is 0.3-50.0 MPa, and the time of pressurization is 5-70 min.

A typical but non-limiting pressure of pressurization is 0.3 MPa, 0.5 MPa, 1.0 MPa, 1.5 MPa, 2.0 MPa, 5.0 MPa, 10.0 MPa, 15.0 MPa, 20.0 MPa, 25.0 MPa, 30.0 MPa, 35.0 MPa, 40.0 MPa, 45.0 MPa or 50.0 MPa; and typical but non-limiting time of pressurization is 5 min, 10 min, 15 min, 20 min, 25 min, 30 min, 35 min, 40 min, 45 min, 50 min, 55 min, 60 min, 65 min, or 70 min.

By limiting the temperature and time of heating and the pressure and time of pressurization, the gas can generate a certain acting force on the molded granules, and after the pressure is suddenly released, it is advantageous to the formation of micropores in the molded granules, thereby facilitating the conversion of graphite into single-layer graphene.

As an optional embodiment of the present disclosure, in step (b), the pressure is released to a normal pressure, and the time for releasing the pressure to the normal pressure is less than 1 min.

The time for releasing the pressure can be determined according to different molded granules. In general, the shorter the time for releasing the pressure, the better.

It should be noted that the normal pressure refers to one atmospheric pressure. Rapidly releasing the pressure in a short period of time can enable the gas to have stronger exfoliation effect on the graphite in the molded granules, and is more favorable for the conversion of graphite into single-layer graphene.

As an optional embodiment of the present disclosure, in step (b), the second solvent includes water and/or a lubricant. Herein "and/or" means that the second solvent includes only water, or includes only a lubricant, or includes both water and a lubricant.

As an optional embodiment of the present disclosure, in step (b), the lubricant includes any one or a combination of at least two of paraffin, polyethylene wax, and calcium stearate.

The addition of lubricant can prevent the adhesion between the expanded granules and expanded granules.

As an optional embodiment of the present disclosure, a preparation method for a cured product containing a single-layer graphene includes the following steps:
  (m) mixing graphite and a curable material, and extruding the same to obtain molded granules, wherein the curable material includes a thermoplastic polymer;
  (n) placing a system formed by the molded granules and water in an air-tight reaction device for heating, a temperature of heating being 50-880° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and
  (o) repeating steps (a) and (b) several times, with the graphite and the curable material in step (a) replaced with the expanded granules, to obtain the cured product containing a single-layer graphene.

Alternatively, the preparation method for a cured product containing a single-layer graphene includes the following steps:
  (p) mixing graphite with a curable material and water, curing and molding the same, and drying the resultant to obtain molded granules, wherein the curable material includes flour or rice flour;
  (q) placing the molded granules in an air-tight reaction device for heating, a temperature of heating being 60-200° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and
  (r) repeating steps (a) and (b) several times, with the graphite and the curable material in step (a) replaced with the expanded granules, to obtain the cured product containing a single-layer graphene.

By further defining the preparation method for a cured product containing a single-layer graphene, the content of the single-layer graphene in the prepared cured product containing a single-layer graphene is higher.

According to a second aspect of the present disclosure, there is further provided a cured product containing a single-layer graphene, prepared by the above preparation method for a cured product containing a single-layer graphene.

The single-layer graphene in the cured product containing a single-layer graphene imparts corresponding properties to the cured product, and the cured product containing a single-layer graphene can be directly applied to industrial production without further processing, for example, can be directly prepared into a plastic article containing a single-layer graphene.

As an optional embodiment of the present disclosure, the mass fraction of the single-layer graphene in the cured product containing a single-layer graphene is 20-99%.

In the cured product containing a single-layer graphene, a typical but non-limiting mass fraction of the single-layer graphene is, for example, 20%, 25%, 30%, 35%, 40%, 45%, 50%, 55%, 60%, 65%, 70%, 75%, 80%, 85%, 90%, 92%, 95% or 99%.

According to a third aspect of the present disclosure, there is further provided a preparation method for a single-layer graphene, including the following steps:
  performing carbonization treatment on the above cured product containing a single-layer graphene, and separating a product obtained through the carbonization treatment to obtain the single-layer graphene.

When the graphite in the curable material is completely converted into graphene, actual ingredients in the cured product containing a single-layer graphene include the curable material and the single-layer graphene; and when the graphite in the curable material is not completely converted into graphene, the actual ingredients in the cured product containing a single-layer graphene include the curable material, the graphite, and the single-layer graphene. The carbonization treatment is actually to perform a high-temperature heating treatment on the cured product containing a single-layer graphene, and the carbonization treatment will carbonize the curable material (including graphite) in the cured product containing a single-layer graphene to from a carbon material, without influencing the single-layer graphene. After the carbonization treatment, the carbon material is separated from the single-layer graphene to obtain the single-layer graphene.

It should be noted that when the curable material is a thermoplastic polymer, the type and the size of molecular weight of the thermoplastic polymer directly affect the temperature and time of the carbonization treatment. Generally, under the premise of the same kind of thermoplastic polymer, to keep substantially consistent performance parameters of single-layer graphene, the larger the molecular weight of the thermoplastic polymer is, the higher the required carbonization treatment temperature is required or the longer the carbonization time is required.

The preparation method is stable in technology, simple in operation, and suitable for industrial scale production, and the single-layer graphene prepared by the preparation method has high purity and excellent performance, and can be directly used for industrial production.

The carbon material obtained after the carbonization treatment further may be subjected to graphitization treatment, and the product after the graphitization treatment is mixed with the curable material and optionally a first solvent, and a cured product containing a single-layer graphene is prepared by the preparation method for a cured product containing a single-layer graphene provided according to the present disclosure.

As an optional embodiment of the present disclosure, the cured product containing a single-layer graphene is subjected to carbonization treatment, and then the product obtained through the carbonization treatment is separated according to specific weight to obtain the single-layer graphene.

As an optional embodiment of the present disclosure, the temperature of the carbonization treatment is 200-500° C., and the time of the carbonization treatment is 0.5-3 h; a typical but non-limiting carbonization temperature is 200° C., 220° C., 240° C., 250° C., 260° C., 280° C., 300° C., 320° C., 340° C., 350° C., 380° C., 400° C., 420° C., 440° C., 450° C., 480° C., or 500° C., and typical but non-limiting carbonization time is 0.5 h, 1 h, 1.3 h, 1.6 h, 2.0 h, 2.3 h, 2.6 h or 3.0 h.

Preferably, a separation medium used in the separation according to the specific weight is water. As the specific weights of the carbon material and the single-layer graphene in the product obtained through the carbonization treatment are different in water, water can be used for separation. According to different specific weights of the carbon material in the product obtained through the carbonization treatment, aqueous solutions with different specific weight can be formulated in water, thereby achieving the purpose of separation.

By defining the carbonization temperature, time, and separation medium adopted when the separation is performed according to specific weight, the single-layer graphene can be separated more sufficiently from the carbonized product, thereby improving the yield and purity of the single-layer graphene.

According to a fourth aspect of the present disclosure, there is further provided a single-layer graphene prepared by the above preparation method for a single-layer graphene.

The single-layer graphene prepared by the above preparation method for a single-layer graphene has high purity and excellent performance, and can be directly used for industrial production.

According to a fifth aspect of the present disclosure, there is further provided an article containing a single-layer graphene, which is prepared with the above cured product containing a single-layer graphene or the above single-layer graphene.

There are many articles containing a single-layer graphene, for example, a medical polyethylene article containing a single-layer graphene, and an ABS composite material containing a single-layer graphene, etc.

Given the advantages of the above cured product containing a single-layer graphene or the single-layer graphene, the article containing a single-layer graphene, with the cured product containing a single-layer graphene or the single-layer graphene as a raw material, is imparted with the same advantages.

In order to illustrate the technical effects that can be achieved by the present disclosure, the following examples and comparative examples are specifically provided.

It should be noted that sources of raw materials used in the examples and the comparative examples are as follows: all the graphite was purchased from Qingdao Jintao Graphite Co., LTD. (Model: 80 meshes); the polypropylene was purchased from Formosa Industries (Ningbo) CO., LTD. (Model: PP1120); polycarbonate was purchased from Covestro Polymers (China) Co., Ltd. (Model: PC1703); and the hot melt adhesive was purchased from Wuxi Laien Technology CO., Ltd. (Model: LE-211).

Example 1

Figure 2:
FIG. 2 is a morphological view of expanded granules provided in Example 1 of the present disclosure.

The present example provides a preparation method for a cured product containing a single-layer graphene, including the following steps:
(s) mixing graphite and a polypropylene curable material, and placing the same in an extruder for extrusion molding to obtain molded granules having a diameter of 3 mm and a length of 3 mm, specifically as shown in FIG. 1, wherein the mass ratio of the graphite to the polypropylene curable material is 30:100, an average particle size of the graphite is 100 meshes, and a weight-average molecular weight of the polypropylene curable material is 1,500;
(t) adding the molded granules to a reaction kettle, then adding water (the mass ratio of the molded granules to water being 100:60) and heating the reaction kettle, the temperature of heating being 85° C., the time of heating being 20 min, then introducing air for pressurization, the pressure of pressurization being 1.4 MPa, the time of pressurization being 15 min, then maintaining the pressure for 10 min, and rapidly releasing the pressure to a normal pressure within 1 s to obtain expanded granules, specifically as shown in FIG. 2; and
(u) repeating steps (a) and (b) 28 times, with the graphite and the polypropylene curable material in step (a) replaced with the expanded granules, to obtain the cured product containing a single-layer graphene.

Example 2

The present example provides a preparation method for a cured product containing a single-layer graphene, including the following steps:
(v) mixing graphite and a polypropylene curable material, and then placing the same in an extruder for extrusion molding to obtain molded granules having a diameter of 3 mm and a length of 3 mm, wherein the mass ratio of the graphite to the polypropylene curable material is 50:100, an average particle size of the graphite is 1,500 meshes, and a weight-average molecular weight of the polypropylene is 8,000;
(w) adding the molded granules to a reaction kettle, then adding water (the mass ratio of the molded granules to water being 100:60) and heating the reaction kettle, the temperature of heating being 125° C., the time of heating being 10 min, then introducing air for pressurization, the pressure of pressurization being 4 MPa, the time of pressurization being 25 min, then maintaining the pressure for 20 min, and rapidly releasing the pressure to a normal pressure within 1 s to obtain expanded granules; and
(x) repeating steps (a) and (b) 18 times, with the graphite and the polypropylene curable material in step (a) replaced with the expanded granules, to obtain the cured product containing a single-layer graphene.

Example 3

The present example provides a preparation method for a cured product containing a single-layer graphene, including the following steps:

(y) mixing graphite and a polypropylene curable material, and placing the same in an extruder for extrusion molding to obtain molded granules having a diameter of 3 mm and a length of 3 mm, wherein the mass ratio of the graphite to the polypropylene curable material is 50:100, an average particle size of the graphite is 1,500 meshes, and a weight-average molecular weight of the polypropylene is 10,000;

(z) adding the molded granules to a reaction kettle, then adding water (the mass ratio of the molded granules to water being 100:60) and heating the reaction kettle, the temperature of heating being 125° C., the time of heating being 20 min, then introducing air for pressurization, the pressure of pressurization being 12 MPa, the time of pressurization being 20 min, then maintaining the pressure for 10 min, and rapidly releasing the pressure to a normal pressure within 1 s to obtain expanded granules; and (aa) repeating steps (a) and (b) 28 times, with the graphite and the polypropylene curable material in step (a) replaced with the expanded granules, to obtain the cured product containing a single-layer graphene.

Example 4

The present example provides a preparation method for a cured product containing a single-layer graphene, including the following steps:

(bb) mixing graphite and a polyurethane curable material, and then placing the same in an extruder for extrusion molding to obtain molded granules having a diameter of 3 mm and a length of 3 mm, wherein the mass ratio of the graphite to the polyurethane curable material is 60:100, an average particle size of the graphite is 1,500 meshes, and a weight-average molecular weight of the polyurethane is 10,000;

(cc) adding the molded granules to a reaction kettle, then adding water (the mass ratio of the molded granules to water being 100:60) and heating the reaction kettle, the temperature of heating being 65° C., the time of heating being 12 min, then introducing air for pressurization, the pressure of pressurization being 3 MPa, the time of pressurization being 11 min, then maintaining the pressure for 8 min, and rapidly releasing the pressure to a normal pressure within 1 s to obtain expanded granules; and (dd) repeating steps (a) and (b) 22 times, with the graphite and the polyurethane curable material in step (a) replaced with the expanded granules, to obtain the cured product containing a single-layer graphene.

Example 5

The present example provides a preparation method for a cured product containing a single-layer graphene, including the following steps:

(ee) mixing graphite and a polycarbonate curable material, and then placing the same in an extruder for extrusion molding to obtain molded granules having a diameter of 3 mm and a length of 3 mm, wherein the mass ratio of the graphite to the polycarbonate curable material is 50:100, an average particle size of the graphite is 2,500 meshes, and a weight-average molecular weight of the polycarbonate curable material is 20,000;

(ff) adding the molded granules to a reaction kettle, then adding water (the mass ratio of the molded granules to water being 100:60) and heating the reaction kettle, the temperature of heating being 150° C., the time of heating being 65 min, then introducing air for pressurization, the pressure of pressurization being 57 MPa, the time of pressurization being 70 min, then maintaining the pressure for 70 min, and rapidly releasing the pressure to a normal pressure within 2 s to obtain expanded granules; and (gg) repeating steps (a) and (b) 14 times, with the graphite and the polycarbonate curable material in step (a) replaced with the expanded granules, to obtain the cured product containing a single-layer graphene.

Example 6

The present example provides a preparation method for a cured product containing a single-layer graphene, including the following steps:

(hh) mixing graphite and a hot melt adhesive curable material, and then placing the same in an extruder for extrusion molding to obtain molded granules having a diameter of 5 mm and a length of 5 mm, wherein the mass ratio of the graphite to the hot melt adhesive curable material is 40:100, an average particle size of the graphite is 5,000 meshes, and a weight-average molecular weight of the hot melt adhesive is 100,000;

(ii) adding the molded granules to a reaction kettle, then adding water (the mass ratio of the molded granules to water being 100:60) and heating the reaction kettle, the temperature of heating being 70° C., the time of heating being 8 min, then introducing air for pressurization, the pressure of pressurization being 1.2 MPa, the time of pressurization being 7 min, then maintaining the pressure for 4 min, and rapidly releasing the pressure to a normal pressure within 1 s to obtain expanded granules; and (jj) repeating steps (a) and (b) 10 times, with the graphite and the hot melt adhesive curable material in step (a) replaced with the expanded granules, to obtain the cured product containing a single-layer graphene.

Example 7

The present example provides a preparation method for a cured product containing a single-layer graphene, including the following steps:

(kk) mixing graphite, flour, and water, and then placing the same in a noodle maker for bracing and granulating, and then drying the resultant to obtain molded granules, wherein the mass ratio of graphite, flour and water is 30:100:35, and an average particle size of the graphite is 4,000 meshes;

(ll) adding the molded granules to a reaction kettle, and heating the reaction kettle, the temperature of heating being 100° C., the time of heating being 10 min, then introducing air for pressurization, the pressure of pressurization being 1.5 MPa, the time of pressurization being 3 min, then maintaining the pressure for 5 min, and rapidly releasing the pressure to a normal pressure within 0.5 s to obtain expanded granules; and (mm) repeating steps (a) and (b) 14 times, with the graphite and the flour in step (a) replaced with the expanded granules, to obtain the cured product containing a single-layer graphene.

Example 8

The present embodiment provides a preparation method for a cured product containing a single-layer graphene, wherein in step (a), the flour is replaced with rice flour, and the remaining steps and process parameters are the same as those in Example 7.

Example 9

The present example provides a preparation method for a cured product containing a single-layer graphene, wherein in step (a), the mass ratio of the graphite to the polypropylene curable material is 50:100, and the remaining steps and process parameters are the same as those in Example 1.

Example 10

The present example provides a preparation method for a cured product containing a single-layer graphene, wherein in step (b), the pressure of pressurization is 60 MPa, and the remaining steps and process parameters are the same as those in Example 1.

Example 11

The present example provides a preparation method for a cured product containing a single-layer graphene, wherein in step (b), the pressure of pressurization is 20 MPa, and the remaining steps and process parameters are the same as those in Example 1.

Example 12

The present example provides a preparation method for a cured product containing a single-layer graphene, including the following steps:
(nn) mixing graphite and an ethylene propylene diene monomer curable material, and then placing the same in an extruder for extrusion molding to obtain molded granules having a diameter of 5 mm and a length of 5 mm, wherein the mass ratio of graphite to ethylene propylene diene monomer curable material is 40:100, an average particle size of graphite is 5,000 meshes, and the mooney viscosity of ethylene propylene diene monomer is 45 N m;
(oo) adding the molded granules to a reaction kettle, then adding water (the mass ratio of the molded granules to water being 100:60) and heating the reaction kettle, the temperature of heating being 95° C., the time of heating being 8 min, then introducing air for pressurization, the pressure of pressurization being 1.6 MPa, the time of pressurization being 15 min, then maintaining the pressure for 4 min, and rapidly releasing the pressure to a normal pressure within 0.5 min to obtain expanded granules; and
(pp) repeating steps (a) and (b) 15 times, with the graphite and the ethylene propylene diene monomer curable material in step (a) replaced with the expanded granules, to obtain the cured product containing a single-layer graphene.

Example 13

The present example provides a preparation method for a single-layer graphene, prepared with the cured product containing a single-layer graphene provided by Example 1 as a raw material, including the following steps:
performing carbonization treatment on the cured product containing a single-layer graphene, the carbonization temperature being 350° C., and the carbonization time being 30 min, and then separating the product obtained after the carbonization with water according to specific weight to obtain the single-layer graphene.

Example 14

The present example provides a preparation method for a single-layer graphene, prepared with the cured product containing a single-layer graphene provided by Example 2 as a raw material. The specific preparation method is the same as Example 13.

Example 15

The present example provides a preparation method for a single-layer graphene, prepared with the cured product containing a single-layer graphene provided by Example 3 as a raw material. The specific preparation method is the same as Example 13.

Example 16

The present example provides a preparation method for a single-layer graphene, prepared with the cured product containing a single-layer graphene provided by Example 4 as a raw material. The specific preparation method is the same as Example 13.

Example 17

The present example provides a preparation method for a single-layer graphene, including the following steps:
performing carbonization treatment on the cured product containing a single-layer graphene provided by Example 5, the temperature of carbonization treatment being 500° C., and the time of carbonization treatment being 180 min, and then separating the product obtained after the carbonization with water according to specific weight to obtain a single-layer graphene.

Example 18

The present example provides a preparation method for a single-layer graphene, including the following steps:
performing carbonization treatment on the cured product containing a single-layer graphene provided by Example 6, the temperature of carbonization treatment being 260° C., and the time of carbonization treatment being 45 min, and then separating the product obtained after the carbonization with water according to specific weight to obtain the single-layer graphene.

Example 19

The present example provides a preparation method for a single-layer graphene, including the following steps:
performing carbonization treatment on the cured product containing a single-layer graphene provided by Example 7, the temperature of carbonization treatment being 200° C., and the time of carbonization treatment being 25 min, and then separating the product obtained after the carbonization with water according to specific weight to obtain the single-layer graphene.

Example 20

The present example provides a preparation method for a single-layer graphene, including the following steps:

performing carbonization treatment on the cured product containing a single-layer graphene provided by Example 8, the temperature of carbonization treatment being 180° C., and the time of carbonization treatment being 18 min, and then separating the product obtained after the carbonization with water according to specific weight to obtain the single-layer graphene.

Example 21

The present example provides a preparation method for a single-layer graphene, prepared with the cured product containing a single-layer graphene provided by Example 9 as a raw material. The specific preparation method is the same as Example 13.

Example 22

The present example provides a preparation method for a single-layer graphene, prepared with the cured product containing a single-layer graphene provided by Example 10 as a raw material. The specific preparation method is the same as Example 13.

Example 23

The present example provides a preparation method for a single-layer graphene, prepared with the cured product containing a single-layer graphene provided by Example 11 as a raw material. The specific preparation method is the same as Example 13.

Example 24

The present example provides a preparation method for a single-layer graphene, prepared with the cured product containing a single-layer graphene provided by Example 12 as a raw material. The specific preparation method is the same as Example 13.

Comparative Example 1

The present comparative example provides a preparation method for a cured product containing a graphene, wherein no heating treatment is performed in step (b), and the remaining steps and process parameters are the same as those in Example 1.

Comparative Example 2

The present comparative example provides a preparation method for a cured product containing a graphene, including the following steps:
(qq) mixing graphite and a polypropylene curable material to form a molded slurry, wherein the mass ratio of the graphite to the polypropylene curable material is 30:100, an average particle size of the graphite is 100 meshes, and a weight-average molecular weight of the polypropylene curable material is 1,500; and
(rr) adding the molded slurry to the reaction kettle, wherein the remaining steps and process parameters are the same as those in Example 1.

Comparative Example 3

The present comparative example provides a preparation method for a cured product containing a graphene, wherein the pressure of pressurization in step (b) is 0.15 MPa, and the remaining steps and process parameters are the same as those in Example 1.

Comparative Example 4

The present comparative example provides a preparation method for a graphene, prepared with the cured product containing a graphene provided by Comparative Example 1 as a raw material. The specific preparation method is the same as Example 13.

Comparative Example 5

The present comparative example provides a preparation method for a graphene, prepared with the cured product containing a graphene provided by Comparative Example 2 as a raw material. The specific preparation method is the same as Example 13.

Comparative Example 6

The present comparative example provides a preparation method for a graphene, prepared with the cured product containing a graphene provided by Comparative Example 3 as a raw material. The specific preparation method is the same as Example 13.

In order to verify the technical effects of various examples and comparative examples in the above, the following experimental example is specifically provided.

Experimental Example 1

Figure 3:
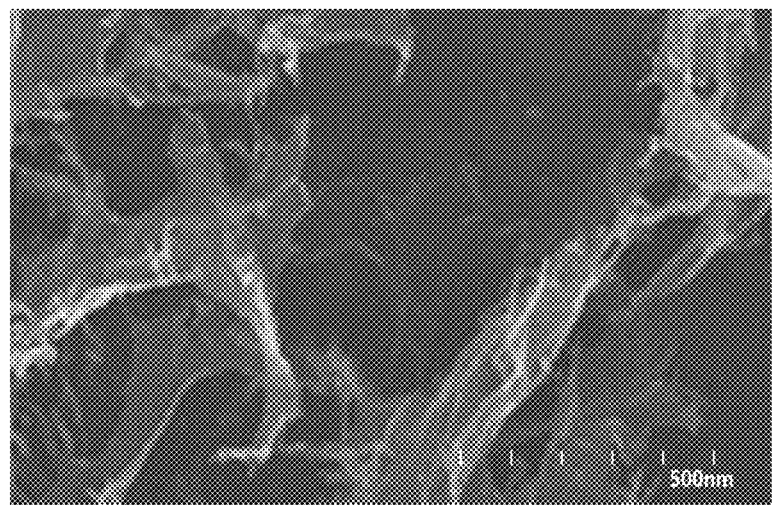
FIG. 3 is an image of a single-layer graphene provided in Example 13 of the present disclosure, obtained by scanning by a high-resolution transmission electron microscope.

Taking Example 13 as an example, a high-resolution transmission electron microscope (HRTEM) is used to scan the single-layer graphene provided by Example 13, specifically as shown in FIG. 3. It can be seen from FIG. 3 that the single-layer graphene has clear morphology, its cross-sectional structure is not an ideal straight line, and its thickness is about 0.18 nm.

The average thickness, light transmittance, yield, and purity of the single-layer graphene or graphene provided by each of Examples 13-24 and Comparative Examples 4-6 were tested, specifically as shown in Table 1.

TABLE 1

| Experiment Group | Average Thickness | Light transmittance (%) | Yield (%) | Purity (%) |
|---|---|---|---|---|
| Example 13 | 0.18 nm | 97.5 | 85 | 96 |
| Example 14 | 0.19 nm | 95.5 | 84 | 94 |
| Example 15 | 0.21 nm | 93.0 | 81 | 91 |
| Example 16 | 0.19 nm | 97.0 | 82 | 95 |
| Example 17 | 0.18 nm | 96.5 | 82 | 96 |
| Example 18 | 0.18 nm | 97.5 | 79 | 97 |
| Example 19 | 0.18 nm | 96.5 | 81 | 91 |
| Example 20 | 0.18 nm | 96.5 | 82 | 92 |
| Example 21 | 0.18 nm | 97.5 | 79 | 87 |
| Example 22 | 0.18 nm | 97.5 | 87 | 98 |
| Example 23 | 0.18 nm | 97.5 | 86 | 97 |
| Example 24 | 0.18 nm | 97.5 | 85 | 96 |
| Comparative Example 4 | 150 μm | 10 | 0 | 0 |
| Comparative Example 5 | 9 μm | 25 | 0 | 0 |
| Comparative Example 6 | 150 μm | 10 | 0 | 0 |

From the data in Table 1, it can be seen that the preparation methods for a single-layer graphene provided by individual examples of the present disclosure are overall superior to the comparative examples.

Specifically, a thermoplastic polymer such as resin or hot melt adhesive, used as a curable material, is mixed with graphite, pelletized by an extruder, and subjected to expansion separation to obtain the cured product containing a single-layer graphene, and after the cured product containing a single-layer graphene is subjected to carbonization treatment, the yield of the obtained single-layer graphene is quite high. However, when the flour or rice flour is taken as a curable material, the content of the single-layer graphene in the cured product containing a single-layer graphene obtained after expansion separation is small, and accordingly, after the cured product containing a single-layer graphene undergoes carbonization treatment, although the single-layer graphene can be obtained, the purity of the single-layer graphene is low. This is mainly because after the thermoplastic polymer and the graphite are extruded and granulated by the extruder, the adhesive force between the two is high, and the flour or rice flour does not reach the adhesive force caused by the granulation of the extruder. Therefore, when choosing the curable material, the thermoplastic polymer is preferred.

Finally, it should be explained that the various examples above are merely used for illustrating the technical solutions of the present disclosure, rather than limiting the present disclosure; although the detailed description is made to the present disclosure with reference to various preceding examples, those ordinarily skilled in the art should understand that they still could modify the technical solutions recited in various preceding examples, or make equivalent substitutions to some or all of the technical features therein; and these modifications or substitutions do not make the corresponding technical solutions essentially depart from the scope of the technical solutions of various examples of the present disclosure.

INDUSTRIAL APPLICABILITY

According to the preparation method for a cured product containing a single-layer graphene provided by the present disclosure, pollutants will not be generated in the whole preparation process, and high purity of the cured product containing a single-layer graphene is ensured. Moreover, the cured product containing a single-layer graphene can be directly applied to industrial production, and can also be subjected to carbonization treatment and separation to obtain the single-layer graphene. This preparation method is stable in technology, simple in operation, and suitable for industrial scale production.

What is claimed is:

1. A preparation method for a cured product containing a single-layer graphene, comprising following steps:
   (a) mixing graphite with a curable material or with the curable material and a first solvent, and curing and molding them to obtain molded granules;
   (b) heating a system formed by the molded granules or by the molded granules and a second solvent, then introducing a gas to the system for pressurization, a pressure of pressurization being 0.2-60.0 Mpa, and then releasing the pressure to obtain expanded granules; and
   (c) repeating steps (a) and (b) several times, with the graphite and the curable material in step (a) replaced with the expanded granules, to obtain the cured product containing a single-layer graphene.

2. The preparation method for a cured product containing a single-layer graphene according to claim 1, wherein in step (a), the curable material comprises any one selected from the group consisting of thermoplastic polymer, flour and rice flour.

3. The preparation method for a cured product containing a single-layer graphene according to claim 2, wherein in step (a), the thermoplastic polymer comprises any one or a combination of at least two selected from the group consisting of resin, plastic, thermoplastic rubber, thermoplastic elastomer, and hot melt adhesive.

4. The preparation method for a cured product containing a single-layer graphene according to claim 3, wherein in step (a), the resin comprises any one or a combination of at least two selected from the group consisting of polyethylene, acrylonitrile-butadiene-styrene copolymer, polycarbonate, polyvinyl chloride, and polypropylene.

5. The preparation method for a cured product containing a single-layer graphene according to claim 3, wherein in step (a), the plastic comprises any one or a combination of at least two selected from the group consisting of rigid thermoplastic plastic, soft plastic, and semi-rigid plastic.

6. The preparation method for a cured product containing a single-layer graphene according to claim 3, wherein in step (a), the thermoplastic rubber comprises any one or a combination of at least two selected from the group consisting of TPU, NBR, SBS, TPE, and EPDM.

7. The preparation method for a cured product containing a single-layer graphene according to claim 3, wherein in step (a), the thermoplastic elastomer comprises any one or a combination of at least two selected from the group consisting of TPEE, PUR, TPV, and TEEE.

8. The preparation method for a cured product containing a single-layer graphene according to claim 1, wherein in step (b), a temperature of heating is 50-880° C., and time of heating is 5-60 min.

9. The preparation method for a cured product containing a single-layer graphene according to claim 1, wherein in step (a), the first solvent comprises water.

10. The preparation method for a cured product containing a single-layer graphene according to claim 1, comprising following steps:
   (a) mixing graphite and a curable material, and extruding them to obtain molded granules, wherein the curable material comprises a thermoplastic polymer;
   (b) placing a system formed by the molded granules and water in an air-tight reaction device for heating, a temperature of heating being 50-880° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and
   (c) repeating steps (a) and (b) several times, with the graphite and the curable material in step (a) replaced with the expanded granules, to obtain the cured product containing a single-layer graphene; and alternatively,
   the preparation method for a cured product containing a single-layer graphene comprises following steps:
   (a) mixing graphite with a curable material and water, curing and molding them, and drying to obtain molded granules, wherein the curable material comprises flour or rice flour;
   (b) placing the molded granules in an air-tight reaction device for heating, a temperature of heating being 60-200° C., and time of heating being 5-60 min, then introducing a gas into the reaction device for pressurization, a pressure of pressurization being 0.2-60.0 MPa, and time of pressurization being 5-50 min, and then releasing the pressure to a normal pressure within 1 min to obtain expanded granules; and (c) repeating steps (a) and (b) several times, with the graphite and the curable material in step (a) replaced with the expanded granules, to obtain the cured product containing a single-layer graphene.

11. The preparation method for a cured product containing a single-layer graphene according to claim 1, wherein in step (a), a particle size of the graphite is 20-12,500 meshes.

12. The preparation method for a cured product containing a single-layer graphene according to claim 1, wherein in step (a), a mass ratio of the graphite to the curable material is (0.5-200):100.

13. The preparation method for a cured product containing a single-layer graphene according to claim 1, wherein in step (a), a particle diameter of the molded granules is 0.2-10 mm.

14. The preparation method for a cured product containing a single-layer graphene according to claim 1, wherein in step (b), the gas comprises any one or a combination of at least two selected from the group consisting of air, oxygen gas, hydrogen gas, carbon dioxide, and nitrogen gas.

15. The preparation method for a cured product containing a single-layer graphene according to claim 1, wherein in step (b), a pressure of pressurization is 0.3-50.0 MPa, and time of pressurization is 5-70 min.

16. The preparation method for a cured product containing a single-layer graphene according to claim 1, wherein in step (b), the pressure is released to a normal pressure, and time for releasing the pressure to the normal pressure is less than 1 min.

17. The preparation method for a cured product containing a single-layer graphene according to claim 1, wherein in step (b), the second solvent comprises water and/or a lubricant.

18. A preparation method for a single-layer graphene, comprising following steps:

(a) mixing graphite with a curable material or with the curable material and a first solvent, and curing and molding them to obtain molded granules;

(b) heating a system formed by the molded granules or by the molded granules and a second solvent, then introducing a gas to the system for pressurization, a pressure of pressurization being 0.2-60.0 Mpa, and then releasing the pressure to obtain expanded granules;

(c) repeating steps (a) and (b) several times, with the graphite and the curable material in step (a) replaced with the expanded granules, to obtain the cured product containing a single-layer graphene;

(d) performing carbonization treatment on the cured product containing a single-layer graphene, and (e) separating a product obtained through the carbonization treatment to obtain the single-layer graphene.

19. The preparation method for a single-layer graphene according to claim 18, wherein in step (e), separating is conducted according to specific weight to obtain the single-layer graphene.

* * * * *